DE BERT HARTLEY.
AEROHYDROPLANE FLYING MACHINE.
APPLICATION FILED JUNE 13, 1913.

1,131,779.

Patented Mar. 16, 1915.

DE BERT HARTLEY.
AEROHYDROPLANE FLYING MACHINE.
APPLICATION FILED JUNE 13, 1913.

1,131,779.

Patented Mar. 16, 1915.
4 SHEETS—SHEET 4.

UNITED STATES PATENT OFFICE.

DE BERT HARTLEY, OF CHICAGO, ILLINOIS.

AEROHYDROPLANE FLYING-MACHINE.

1,131,779.      Specification of Letters Patent.      Patented Mar. 16, 1915.

Application filed June 13, 1913. Serial No. 773,446.

*To all whom it may concern:*

Be it known that I, DE BERT HARTLEY, a citizen of the United States, and a resident of Chicago, in the county of Cook and State of Illinois, have invented certain new and useful Improvements in Aerohydroplane Flying-Machines; and I do hereby declare that the following is a full, clear, and exact description thereof, reference being had to the accompanying drawings, and to the characters of reference marked thereon, which form a part of this specification.

This invention relates to improvements in that type of heavier than air flying machines known as aeroplanes wherein the weight of the machine and its load is sustained by the reactions resulting in moving an aeroplane edgewise through the air by mechanical power or otherwise at a small angle of incidence.

The present invention is, in general terms, an improvement on the construction set forth in my prior U. S. Letters Patent, No. 1,068,651, issued on the 29th day of June, 1913, and more especially it is an improvement with respect to the means for maintaining the equilibrium of the machine, and, further, for diversifying the use of the machine as an air, water or land craft.

Among the objects of the present invention is to simplify and improve the construction of flying machines of this type; to provide a machine which may be used as a combined hydro and aeroplane to start from either land or water and to provide a machine in which the main body thereof and the power plant may be used separately either for a land vehicle or a water craft.

Another object of the invention is to furnish an adjustable, mechanically operated, automatic wing warping mechanism for balancing, steering and slowing down or accelerating the speed of the machine, with controlling devices which may be operated by the weight of the machine and its load in resisting the different elements or forces which serve to change the body from an even keel. Said steering, balancing and warping mechanism may also be manually controlled. In the arrangement of the supporting and steering planes and the mechanism shown for operating them, the angle of incidence may be controlled by the dihedral angle of the wings. In perfect air conditions the dihedral may be substantially or entirely eliminated, thus decreasing the angle of incidence and the resistance to flight. These latter conditions may obtain when flying with a light load and at high speed.

A further object of the invention is to provide a supporting and alighting wheel, made with one or more air-tight compartments, and of a diameter sufficient to overcome small obstacles when on land, and large enough to act as pontoon elements when the machine is in water to give added buoyancy to the machine, and to permit the front wheels to function to prevent the machine from tipping or turning sidewise when supported on the water. The wheels at the front end of the boat may be connected to the boat body through the medium of a shock absorbing apparatus which is designed to be readily adjusted with respect to the resiliency of the springs of the shock absorbing devices, and may also be designed to permit the axle which carries the wheel to be raised into a recess of the body, and thereby raise the front wheels and lessen the air or water resistance to the forward movement of the machine when traveling in the air or on water.

A further object of the invention is to produce a construction that provides for a changeable load, by having a removable carrying and stabilizing plane which is detachably fitted to the machine in such a manner that it may be readily removed so as to thereby permit the reduction of the surface of resistance to forward flight and thereby permit a higher rate of speed to be attained. In the present construction when the auxiliary stabilizing and supporting plane be removed, the machine becomes a hydromonoplane in form and operation.

A further object of the invention is to provide a supporting, rocking mounted tail or following plane at the rear of the machine, and connected to a spring or springs which permit the machine to be steered automatically or manually. This may be accomplished by having the tail plane pivoted to the frame of the machine with unequal effective carrying surfaces at the front and rear of its pivot, the greater effective carrying surface being at the front of the pivot, and adapted to coöperate with the spring controlled devices on the machine frame so that tilting of the machine forwardly or backwardly acts to change the angle of the tail plane and to thereby bring it back to a straight line of flight to maintain the machine in straight flight. The following plane is adapted to be worked so as to act as a steering and balancing element.

Another object of the invention is to provide a rear single or multi-chambered pontoon wheel which acts as a support for the rear end of the machine, either on land or in the water, and also acts as a rudder when the machine is traveling forwardly either in the air, on land or in the water. This rear wheel may act in conjunction with a vertical steering plane which may be carried by the swinging frame on which the wheel is mounted. The wheel may also be arranged to work in connection with the rocking tail plane when so desired.

Other objects of the invention are to simplify, improve and diversify the uses of such a machine and the invention consists in the matters hereinafter set forth and more particularly pointed out in the appended claims.

In the drawings: Fig. 4 is a plan view of the machine, with parts broken away.

The machine herein shown is what may be termed an adjustable monoplane type, in that there is provided a centrally arranged, auxiliary detachable supporting and stabilizing plane, arranged over the inner ends of the side wings or planes.

The main plane elements of the machine herein shown embrace the auxiliary plane 20, two main side planes or wings 21, 21 which extend in opposite directions from the auxiliary plane 20, a horizontal, rocking trailing plane 22 at the rear end of the machine, and a vertical plane or rudder 22$^a$ at the rear portion of the horizontal rudder.

23 designates, what may be termed, the body or main frame of the machine. It has the form of an elongated boat structure, which in certain uses of the machine, hereinafter to be described, functions as a boat, and it carries and supports the various plane elements hereinafter to be described and the mechanism for controlling the same, and the supporting and alighting wheels. The said boat like body is supported, when resting on the ground, by a pair of front wheels, 24, 24, and a single, centrally disposed rear wheel 25. The front wheels 24 are rotatively mounted on an axle 26 supported in the manner hereinafter described by the body 23, and the rear wheel 25 (which may function as a rudder in the air or in water, or as a steering wheel on land) is mounted on an axle 27 carried by a horizontally swinging frame 30 which is pivoted to the rear end of the boat body, as by means of the vertical pivot bolt 31. The said wheels 24 and 25 have narrow peripheries and are widened at their centers, and are made hollow (each with one or more air chambers) so as to enable them, first, to readily travel on land, and are of such diameter as to permit them to readily pass over obstructions on the ground, and, second, to render them buoyant in water and readily leave the water when the machine rises therefrom. They are of sufficient buoyancy to permit them to act as pontoons at the sides of the boat to prevent the boat from tilting sidewise while in the water.

Figures 1, 2, 3:
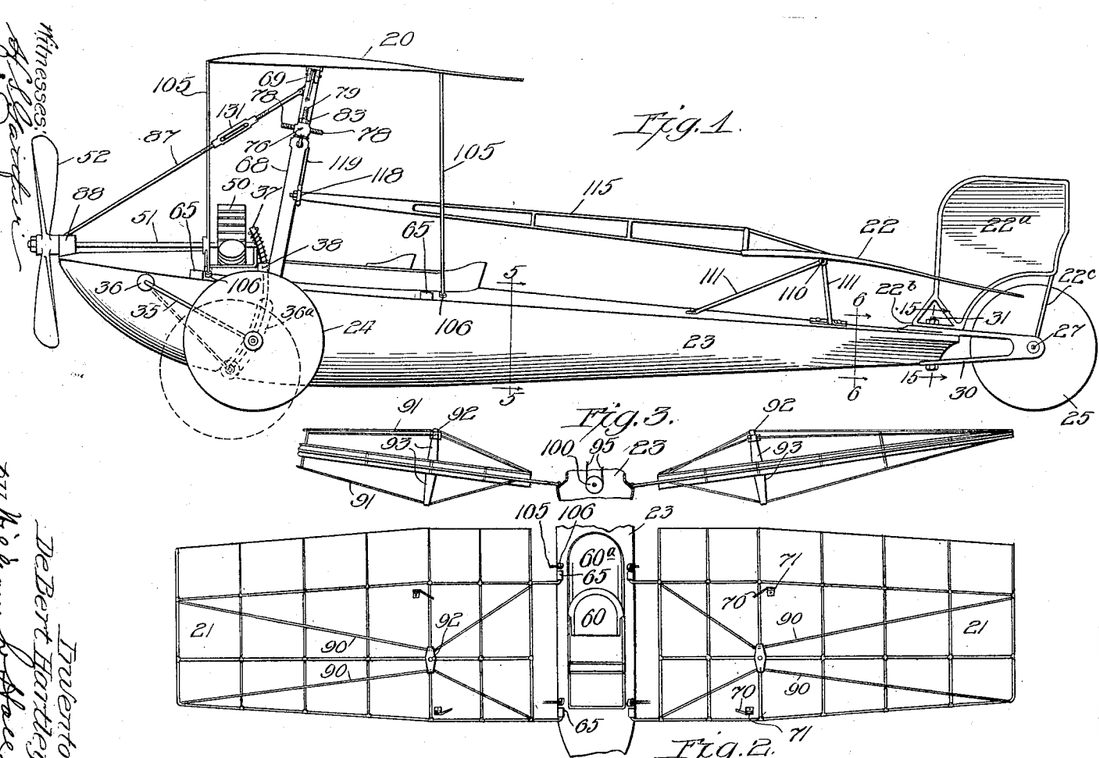
—Figure 1 is a side elevation of a combined aero- and hydroplane embodying my invention.
Fig. 2 is a partial plan view thereof.
Fig. 3 is a fragmentary diagrammatic view illustrating the relation of the side planes or wings to the frame of the machine.
Figures 7, 8, 9, 10, 11:
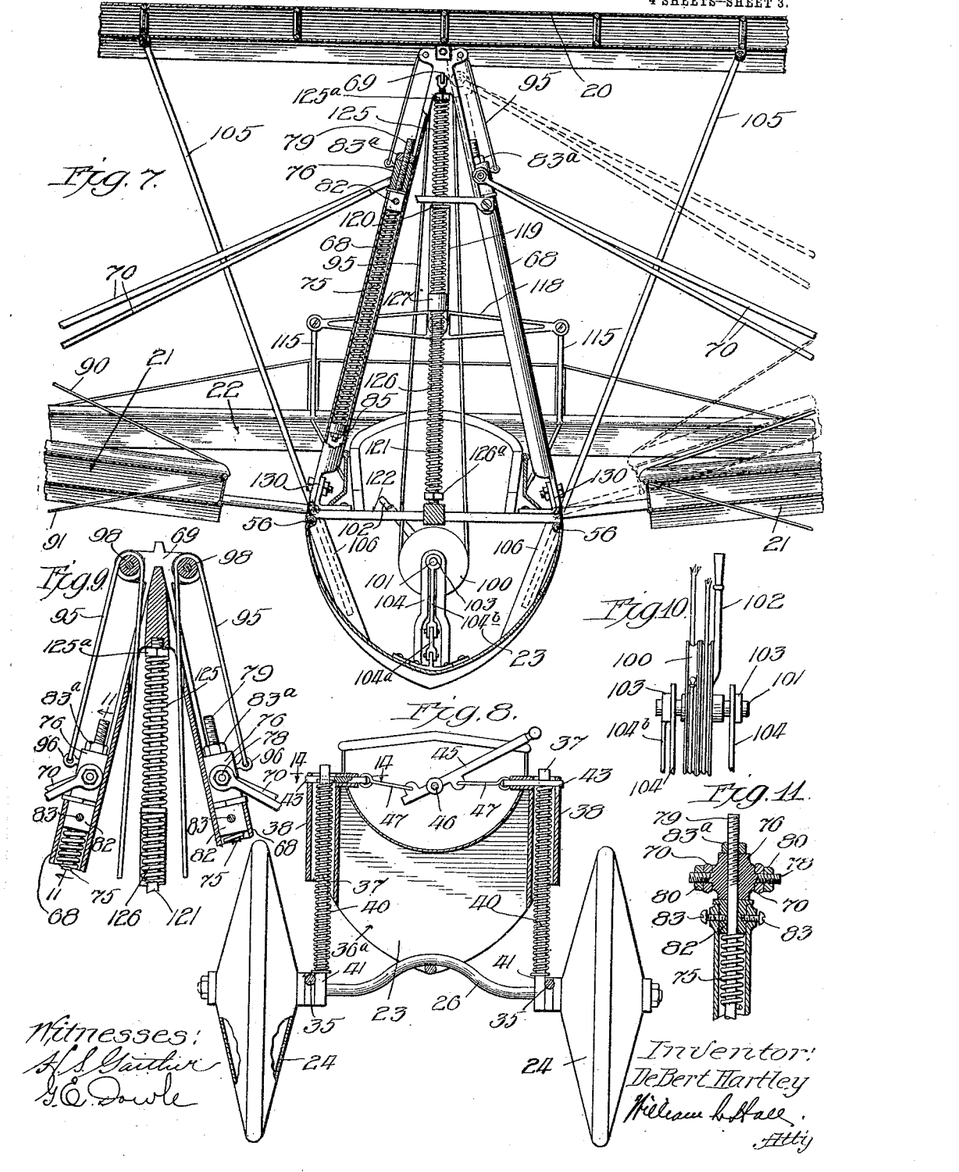
Fig. 7 is a partial front elevation and a partial vertical section of the machine, showing the mechanism for actuating the side planes or wings and the rudder.
Fig. 8 is a fragmentary detail illustrating the pontoon boat body and the front alighting wheels, with the means for yieldingly supporting the body on said wheels.
Fig. 9 is a view illustrating the yielding elements which coöperate with the planes to afford equilibrium.
Fig. 10 is a detail view illustrating the hand operated means for actuating the side planes or wings.
Fig. 11 is a detail view on the line 11—11 of Fig. 9.

The forward wheels 24 are yieldingly connected to the boat body 23 so as to provide a cushioning or shock absorbing effect between the wheels and the boat body when the machine alights on land or in the water. Such yielding connection may be effected by the construction herein shown and made as follows: The front axle 26 is connected to the boat body by the radius bars 35, 35 fixed at their rear ends to the axle and pivotally connected at their front ends, at 36, to the boat body, whereby the axle rises and falls in an arc concentric to the pivot 36. The boat body is recessed at 36$^a$ as shown in Figs. 1 and 8 to receive the axle 26 when the wheels are raised. 37, 37 designate curved guide and supporting bars that are fixed at their lower ends to the axle and extend upwardly through sleeves 38 at the sides of the front of the boat body. The said guide and supporting bars are surrounded by spiral compression springs 40 which are interposed between fittings 41, 41 on the axle 26 and horizontal, forked plates 43, 43, which slide across the upper ends of the sleeves 38 and straddle the bars 37 and constitute abutments, when in place, to bear against and confine the upper ends of the springs 40, as most clearly shown in Fig. 8. When the parts are in positions shown in Figs. 8 and 14, the springs 40 constitute yielding connections between the front alighting wheels 24 and the boat body, so that when the machine alights the springs relieve the shocks or jars that would otherwise be transmitted to the machine.

When the machine is in flight in the air or is floating on the water, it is desirable that the wheels 24 and the axle 26 shall be raised to the position indicated in full lines in Fig. 1, the dotted lines of the said figure indicating the lower positions of said front wheels. This raising of the wheels and the axle may be effected by releasing the abutment plates 43 from the upper ends of the springs to allow the springs to rise. Such release of the abutment plates may be effected by the use of a single lever 45 that is pivoted at 46 to the boat frame in any suitable manner, and connected by the links 47, 47, on opposite sides of its pivot, to the abutment plates, as most clearly shown in Figs. 8 and 14.

Figures 13, 14, 15, 16:
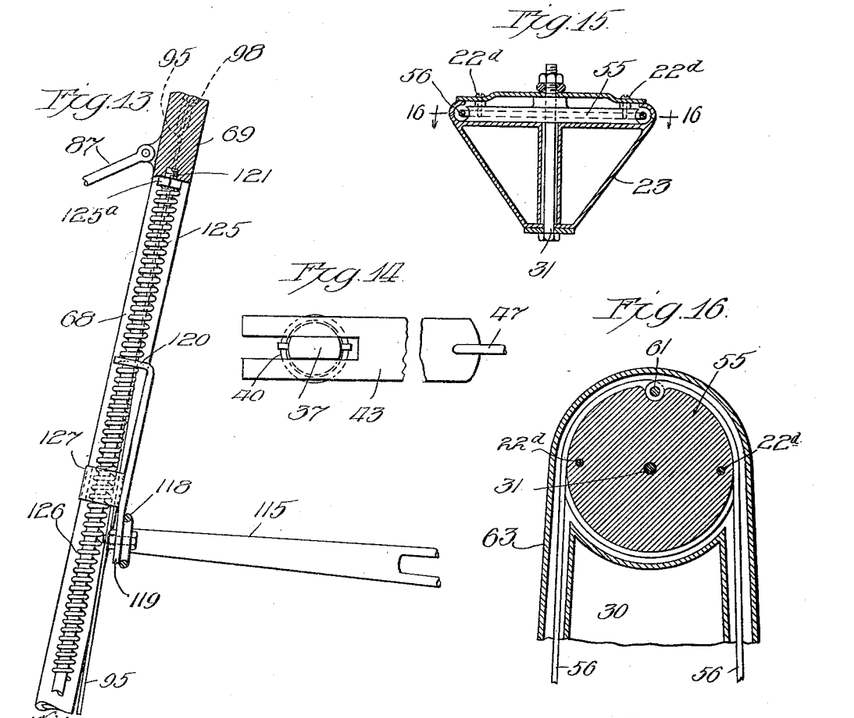
Fig. 13 is a detail illustrating the yielding elements for controlling the trailing plane and rudder.
Fig. 14 is a detail plan view on the line 14—14 of Fig. 8.
Fig. 15 is a detail vertical section taken on the line 15—15 of Fig. 1.
Fig. 16 is a horizontal section taken on the line 16—16 of Fig. 15.

50 designates the driving motor of the machine, herein shown as one or more rotary gas engines. The shaft 51 of the motor, which has suitable rotative bearing in the machine frame, carries at its forward end the usual or any preferred form of propeller 52. This propeller is adapted to drive the machine either as a land vehicle or as an air or water craft. When the machine is used as a land craft, a water craft or an air craft, it may be guided or steered by the rear wheel 25, and in certain uses of the machine, as when in flight in the air, the rudder 22$^a$ may be employed to assist in guiding the machine. The horizontal swinging frame 30 which carries said rear wheel and the vertical rudder 22$^a$ and is pivoted on the vertical pivot bolt or pin 31, is actuated or controlled by means of a pulley 55 which is fixed in any suitable manner to the horizontal swinging frame 30 and concentrically mounted on the pin 31, and a cable 56 that is trained about the said pulley and is carried forwardly, one lap at each side of the boat, to a controlling device, as the controlling wheel 58 adjacent to the pilot's and passengers' seats 60 and 60$^a$. Said cable 56 is attached to the pulley 55 at 61, as shown in Fig. 16, and is guided through suitable guide tubes 63 at the lateral sides of the boat body, and other pulleys 64 near the pilot's seat to the controlling wheel 58.

The vertical steering plane or rudder 22$^a$ is detachably fixed to the swinging frame 30 by the arms 22$^b$ and 22$^c$, the latter having eyes through which the axle 27 removably extends and the former arms 22$^b$ being attached to the pulley portion of the frame by the screws 22$^d$.

Referring now to the arrangement of the various planes and the means for operating them, the same are made as follows: The side or lateral planes 21 are hinged at points 65 to the body or main frame 23, the hinges being of any suitable construction to permit the wings to rise and fall at their free ends and also to permit the wings to be readily detached. The said wings are connected to yielding balancing elements carried by two upright posts 68, which constitute a portion of the frame of the machine. Said posts are fixed at their lower ends in any suitable manner to the opposite sides of the boat or body frame and extend upwardly and toward each other and are fixed together at their upper ends by means of a fitting 69.

Figure 12:
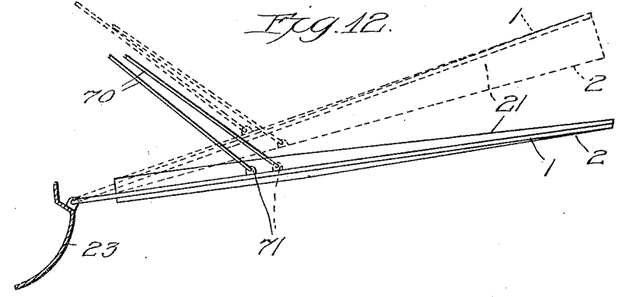
Fig. 12 is a view, diagrammatic in its nature, illustrating the action of the side planes or wings under different dihedral adjustments.

70, 70 designate brace rods, arranged in pairs at the opposite sides of the machine. They are attached at their outer ends at 71, (Figs. 2, 4 and 12) to the upper sides of the wings and are connected at their inner ends to the yielding balancing elements carried by the machine frame. As herein shown, said yielding balancing elements comprise spiral springs 75, 75 which are arranged within the posts 68, the latter being made hollow to receive the springs. The upper ends of said brace bars 70 are herein shown as attached to studs 78, as by the nuts 80. Said studs extend oppositely from fittings or collars 76 which are attached to the upper ends of rods 79 inclosed within the springs 75, and which extend upwardly beyond the hollow tubes or posts. The rods 79 extend through guide sleeves 82 which are attached at the upper ends of said tubes 68, as by the screws 83. The springs 75 are interposed between said guide sleeves 82 thus fixed to the tubes and collars 85 fixed to the lower ends of said rods (Fig. 7). The compression of said springs 75 may be varied by adjustment of the nuts 83$^a$ screw-threaded to the rods 79 and bearing against the upper ends of the collars or fittings 76. It will thus be seen that when the upper ends of the wings are raised their tendency to rise is opposed by the springs 75. When, however, the force tending to raise the wings is sufficient to overcome the force of the springs as, for instance, should the wings receive a force sufficient to disturb the center of gravity of the machine, or should for other reason the center of gravity be disturbed, the yielding balancing springs will permit the wing toward which the machine may thus be tilted to rise and such rising of the wing acts in the manner described in my aforesaid prior application to maintain the balance or equilibrium of the machine. Thus the machine is automatically maintained in equilibrium. The wings are also connected to means for manually operating them in order to steer the machine laterally, which, in the present construction is effected by changing the dihedral angle of the wings. As a further improvement, the same movement which effects changes in the dihedral angles of the wings also effects the warping of the wings in a manner to change the angle of incidence thereof. Thus, when the machine is alighting the dihedral angle of the wings, with respect to each other, may be decreased and at the same time the wings may be warped to present a greater surface toward the direction in which the machine is moving, so as to thereby afford a braking effect to arrest the forward movement of the machine. In this operation of the machine the movements of the wings of a bird, preparing to alight, are closely simulated, and the same effect in slowing the movement of the machine and steadying its action, is produced as in the reflective movements of a bird when alighting. The means whereby these results are produced are herein shown as made as follows: The hollow posts or tubes 68 are inclined rearwardly from the vertical, when viewing the machine from the side thereof, and they may be braced by one or more brace rods 87 extending from the upper ends of the posts to the bearing 88 for the forward end of the propeller shaft. By reason of the rearward inclination of the said posts and of the fact that the inner ends of the brace rods 70 are guided by their connection with the rods 79, when the outer ends of the wings 21 are raised, (either manually or automatically) there is a tendency to raise the front edges of the wings more rapidly than the rear edges, as will be clear from an inspection of Fig. 12 wherein 1 and 2 designate the front and trailing edges, respectively, of such planes; and by reason of the fact that the inner ends of the wings are held relatively fixed, as regards their front and rear edges, this tendency results in warping the wings so as to present a greater surface of the outer ends of the wings toward the direction of motion of the machine. This effect is present whether the wings be automatically or manually moved. The described action of the side planes or wings becomes most useful when the wings are operated by hand, either in turning the machine laterally or in manipulating the wings preparatory to alighting. In turning the machine laterally or "banking" it against the air at a turn, the wing or plane on the side of the machine toward which the machine is to be turned is raised, with the result that an increased surface is presented to the air toward the direction in which the machine is traveling, thereby effecting a braking action at the side of the machine having the raised wing or plane, so as to thereby retard the movement of this side of the machine and cause the machine to pivot. The other side wing or plane may or may not be manipulated during the time of turning, depending upon the conditions, and the manner in which the pilot may handle the machine. In preparing the machine to alight or in descending from a higher to a lower altitude, both wings may be swung upwardly to decrease the dihedral angle between them, and, at the same time, the wings are warped so as to effect a braking action on the machine. The decreasing of the dihedral angle has the effect to steady the machine, inasmuch as the center of gravity of the machine and its load is thereby lowered. This effect, taken in connection with the braking action, gives the machine greater capability of safely alighting and greatly adds to the safety of the machine when in flight.

The springs 75 may be adjusted so as to maintain a selected dihedrality of the wings when in flight in a straight course by the nuts 83$^a$. This angle may be varied however, by varying the adjustment of the springs. In order to increase the warping action on the wings, when they are raised, the front brace rods 70 of each pair may be attached to the wings 21 somewhat nearer to the machine body than the rear brace rods, as shown in Figs. 2 and 4.

The wings may be made of any approved construction and are shown as braced by upper and lower brace wires or cables 90, 91, respectively, attached at their inner ends to the inner end edges of the wings and at their outer ends to the outer end edges of the wings, and are trained between their ends through suitable guides 92 carried by the posts 93 extending upwardly and downwardly from the wings, as best shown in Figs. 2, 3 and 4.

A convenient mode of operating the side wings or planes by hand or foot power is herein shown and is made as follows: 95, 95 designate cables that are attached to the eyes 96 carried by the collars 76 of the guide rods 79. Said cables are trained about guide pulleys 98 carried by the upper end of the fitting 69, and are thence carried downwardly to and are trained about the twin-grooved pulley 100. The said pulley is mounted on a shaft 101 carried by the frame of the machine and is provided with a hand lever 102 by which it is rotated. When the pulley is turned in one direction it draws one of the cables 95 downwardly and releases the other cable, (or vice versa) and thereby acts through the rods 70 to raise the outer end of one of the wings or side planes 21. Thus the side planes may be separately swung on their hinges by the pilot, as when turning or "banking." In order to swing both of the side planes upwardly at the same time, as when preparing to alight, the shaft 101 and its pulley 100 may be drawn downwardly so as to draw both of the laps of the cable 95 downwardly at once. In order to effect this result, both of the bearings 103 for the shaft may be slidingly mounted in vertical, grooved bearing plates 104, and said shaft and its bearings depressed by a foot lever 104$^a$ pivoted to the boat body and connected to the shaft bearings by the flexible connections 104$^b$, as shown in Figs. 4, 7 and 10.

The supplemental plane 20, when employed, gives additional supporting and stabilizing surface to the machine, so as to thereby enable a larger load to be safely carried at a somewhat slower speed than when the side planes 21 are employed to constitute the principal sustaining surface. The said upper plane is supported on the boat body or machine frame by means of posts 105 which extend from near the outer edges of the upper plane downwardly and inwardly to engage at their lower ends sockets formed in socket members 106 at the sides of the boat body. These posts are adapted to detachably engage the sockets so that the auxiliary plane may be readily removed when the machine is to be knocked down, or to be used where the auxiliary plane is not required, as for light loads at a high rate of speed. So also the side planes or wings are capable of ready detachment from the body of the machine at their hinges 65 and the connection of the brace rods 70 with the yielding balancing elements.

The trailing plane 22 is unequally pivoted, supported between its front and rear edges on a horizontal pivot rod 110 that is mounted on standards 111, 111 which are attached to and rise from the rear end of the boat body. The said trailing plane is notched at its rear edge to give room for the rear steering wheel or rudder 25 and also to receive the vertical steering plane or rudder 22$^a$ that is carried by the horizontally swinging frame 30 of the steering wheel or rudder 25. The said horizontal trailing plane 22 is actuated to steer and raise and lower the machine by actuating bars 115, 115 which are fixed at their rear ends to the trailing plane and extend forwardly therefrom with their forward ends adjacent to the pilot's seat. When said actuating bars are simultaneously moved in the same direction and to the same extent they act merely to raise or lower the rear portion of the trailing plane, depending upon the direction of movement imparted to the actuating bars. When the said bars are raised or lowered to unequal extents a warping movement will be imparted to the trailing plane. Thus this action of the trailing plane may effect the raising or lowering of the machine, when the trailing plane is rocked on its pivot, or it may function to give lateral steering movement to the machine when the plane is warped by unequal movement of the actuating bars thereof. In order to facilitate the manipulation of the said rocking, trailing plane actuating bars, they are herein shown as attached at their forward ends to a swinging beam 118 which is centrally pivoted to the lower end of a bracket 119, which latter is supported on an upright frame rod 121 that extends between a cross bar 122 of the boat structure and the fitting 69, before referred to, the fitting being socketed to receive the upper end of the rod. Said bracket is provided at its upper end with a forwardly turned portion 120 that is apertured to fit over said rod 121. The said rod 121 is provided above the forwardly turned portion 120 of the bracket with a spring 125 which surrounds the rod and is interposed between the bracket and an adjusting nut 125$^a$ screw-threaded to the rod adjacent to the fitting 69. The rod is provided below said forwardly turned portion of the bracket with another spring 126 which is interposed between the bracket and an adjusting nut 126$^a$ screw-threaded to the rod adjacent to the cross bar 122. The said bracket preferably carries a guide sleeve 127 which surrounds the lower spring. Said springs are compression springs and act upon the forwardly turned portion of the bracket to hold the same in a given position, and to thereby yieldingly support the beam 118 to which the forward ends of the rocking, trailing plane actuating bars 115 are attached. The adjusting nuts 125$^a$ and 126$^a$ permit the strength of the springs 125 and 126 to be adjusted, and thereby adjust the springs to a given load of the machine, and also adjust the trailing plane to the desired angle of incidence. With this construction when the trailing plane is to be swung upwardly or downwardly at its rear edge to raise or lower the altitude of flight of the machine, both actuating bars thereof may be manipulated at the same time by raising the beam 118 upwardly or depressing it downwardly as required. When it is desired to warp the trailing plane 28 to assist in steering the machine laterally, the beam 118 is swung on its pivot so as to thereby raise one trailing plane actuating bar and lower the other. The yielding connection of the trailing plane actuating bars with the machine frame, thus afforded, automatically maintains the trailing plane yieldingly in a given position while permitting it to yield in either direction against the action of air currents and thereby serves to automatically maintain the equilibrium of the machine so far as the effect of the trailing plane of the machine is concerned. This automatic action of the trailing plane is due to the fact that the effective action of the sustaining body of air against the under side of the rocking or tilting trailing plane is mainly in front of its pivotal or rocking connection with the machine frame or boat body, due to the fact that the greatest tilting effect of the body of sustaining air is at the entering edge of a plane moving through the air. Therefore, although the area of the under side of the trailing plane is largely in rear of the rocking or pivotal connection thereof with the frame or boat body, the normal overbalance of the underneath air pressure is against that part of the plane in front of its pivot, and the normal tendency of such overbalance is to effect an upward compression against the upper spring 125. When, therefore, there is a disturbance of this overbalance, the springs 125 and 126 tend to restore the normal position of the trailing plane, and to, therefore, tend to automatically maintain said trailing plane in the position to effect longitudinal equilibrium of the machine in flight and to maintain the machine in straight course for flight. The trailing plane may be readily detached from the machine frame at its pivotal connection therewith and the actuating arms may be readily removed from the beam 118.

The machine may be stripped of its plane elements and portions of the mechanism for actuating and controlling them. In this condition it may be used as a water or a land craft. In such use of the machine the vertical rudder 22ᵃ may also be detached from the swinging frame 30. When the machine is used as a water craft the front wheels 24 will preferably be drawn upwardly to the upper full line position shown in Fig. 1, in which position the front wheels will maintain their efficiency for lateral balance of the machine, and the rear wheel 25 will be used as a rudder to steer the boat. The wheels are made hollow to give buoyance to the boat structure in the water.

Figures 1, 5, 6:
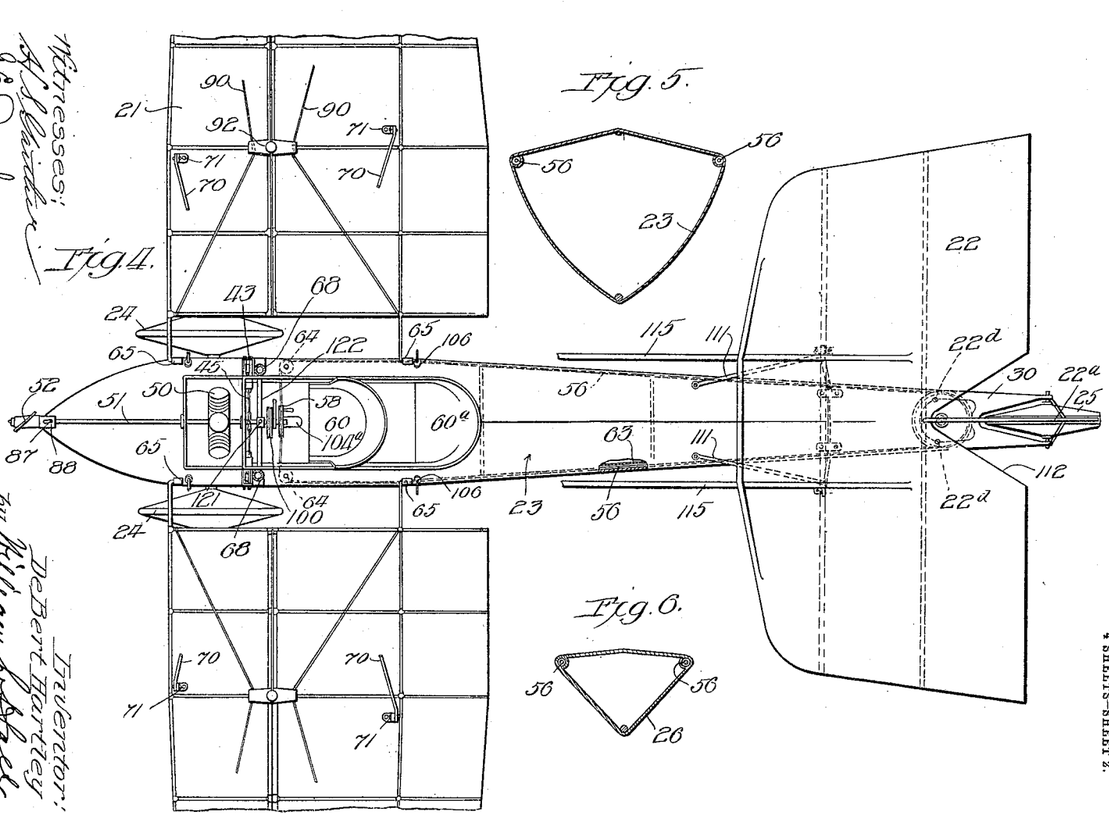
Figs. 5 and 6 are transverse sections of the pontoon or boat body of the machine, taken on the lines 5—5 and 6—6, respectively, of Fig. 1.

By reason of the tapered contour of the wheels from their axes to their peripheries, they constitute substantial pontoon or supporting elements and means to prevent sidewise tipping of the machine in the water, while also of a contour to readily leave the water when the machine, operating as a hydro-aeroplane, is raised from the water. From a comparison of Figs. 5, 6 and 15, which show cross sections of the boat body at different points, it will be noted that the body, while having ample width at its front end to maintain the boat laterally stable in water, it tapers rearwardly so as to permit the body to readily free itself from the water when rising for flight from a body of water, and to readily enter the water.

As a further and separate improvement the posts 68 are hinged at 130 to the boat body to swing forwardly and rearwardly, and the brace bar 87 is adapted to be adjustably elongated, as by means of the turnbuckle 131 (Fig. 1). Thus the angle of the posts may be varied to vary the warping effect given to the side planes or wings in the different dihedral adjustments, or the brace bar or rod 87 may be parted at the turnbuckle to permit the posts to be swung backwardly upon the boat structure during transportation. The body cross bar 122 will be mounted to rock in its bearings to permit the angle or the rod 121 to also be changed and to permit it to swing backwardly with the posts 68.

It will be understood that the structural details illustrated herein may be considerably varied within the scope and spirit of the invention, and the invention is not limited to the details shown and described except as hereinafter made the subject of specific claims and as imposed by the prior art.

I claim as my invention:—

1. In an aeroplane flying machine, a frame, a warpable plane member hinged thereto and capable of both a manual and an automatic swinging movement, and controlling means for said plane, constructed to automatically warp said plane upon either its manual or automatic swinging movement.

2. An aero-plane flying machine comprising a frame, oppositely extending warpable planes hinged or pivoted thereto to swing vertically, and means coöperating with said frame and planes to swing the planes and to simultaneously warp said planes with their entering edges elevated above their trailing edges when the planes are swung upwardly.

3. In an aeroplane flying machine, a frame, oppositely extending planes hinged to the frame to swing vertically and constituting the principal supporting surfaces of the machine, yielding balancing elements carried by said frame and connected to the planes to control the swinging movements of said planes, and means coöperating with the balancing elements to simultaneously and automatically effect warping of each plane as it is swung on its hinges.

4. In an aero-plane flying machine, a frame, oppositely extending planes or wings hinged to said frame to swing vertically to vary the dihedral angle of the planes relatively to each other and inclined guiding means carried by the frame and operatively connected to said planes in a manner to automatically warp each plane during the swinging movement thereof.

5. In an aeroplane flying machine, a frame, oppositely extending planes or wings hinged to said frame to swing vertically to vary the dihedral angle of the planes, guiding means carried by the frame and connected to said planes to warp them during the swinging movements of the planes, and adjusting means to vary the warping movements of the planes relatively to the dihedral angles thereof.

6. In an aeroplane flying machine, a frame, oppositely extending warpable planes hinged to the frame to swing vertically, and means above the hinges of said planes for separately and for also simultaneously controlling the swinging movements of said planes, combined with means to automatically warp each plane during the swinging movement thereof.

7. In an aeroplane flying machine, a frame, plane members hinged thereto, means whereby said planes are swung on their hinges to vary their dihedral angle, and means whereby each plane is warped to raise the principal part of the front edge of said plane upwardly when the outer end of said plane is swung upwardly to decrease the dihedral angle of the same relatively to the other plane.

8. In an aeroplane flying machine, a frame, oppositely extending planes or wings hinged to said frame to swing vertically, posts constituting parts of said frame, guides carried by said posts, brace rods connected to said guides and to the planes between the ends of the latter and spring elements associated with said posts and acting on said guides to yieldingly hold said planes in operative position for flight, said guides being inclined rearwardly and upwardly.

9. In an aeroplane flying machine, a frame, oppositely extending planes or wings hinged to said frame to swing vertically, posts constituting parts of said frame, guides carried by said posts, brace rods connected to said guides and to the planes between the ends of the latter, spring elements associated with said posts and acting on said guides to yieldingly hold the said planes in operative position for flight, said guides being inclined upwardly and rearwardly and means for adjusting the spring elements to vary the dihedral angle of said wings or planes.

10. In an aeroplane flying machine, a frame, oppositely extending planes or wings hinged to said frame to swing vertically, posts constituting parts of said frame, guides carried by said posts, brace rods connected to said guides and to the planes, between the ends of the latter, spring elements associated with said posts and acting on said guides to yieldingly hold the said planes in operative position for flight, said guides being inclined rearwardly and upwardly, and means for manually manipulating said planes.

11. In an aeroplane flying machine, a frame, oppositely extending planes or wings hinged to said frame to swing vertically, hollow posts constituting parts of said frame and inclined rearwardly at their upper ends, guides within said posts, connections between said guides and said planes and springs within said hollow posts and acting on said planes in opposition to the upward swinging movement thereof.

12. In an aeroplane flying machine, a frame, oppositely extending planes hinged to said frame to swing vertically, hollow posts constituting parts of said frame and inclined rearwardly at their upper ends, guides within said posts, and brace elements arranged in pairs at the sides of the machine connecting the guides to the planes, the elements of each pair being connected to the associated plane at laterally separated points.

13. In an aeroplane flying machine, a frame, oppositely extending planes hinged to said frame to swing vertically, hollow posts constituting parts of said frame and inclined rearwardly at their upper ends, guide rods slidable in said hollow posts, springs applied to said rods tending to force the rods into said posts, and brace rods attached at their inner ends to said rods and at their outer ends to the swinging planes between their hinges and the free ends of the planes.

14. In an aeroplane flying machine, a frame, oppositely extending planes hinged to said frame to swing vertically, hollow posts constituting parts of said frame and inclined rearwardly at their upper ends, guide rods in said hollow posts, sleeves fixed to said posts between which and collars at the lower ends of the rods compression springs, surrounding the rods, are interposed and brace rods attached at their inner ends to said guide rods and at their outer ends to the planes at points remote from the hinges of the planes.

15. In an aeroplane flying machine, a frame, oppositely extending planes hinged to said frame to swing vertically, hollow posts constituting parts of the frame and inclined rearwardly at their upper ends, guide rods in said hollow posts, sleeves attached to said posts between which and collars at the lower ends of the rods compression springs, surrounding the rods, are interposed, brace rods attached at their inner ends to said guide rods and at their outer ends to the planes at points remote from the hinges of the planes, and adjusting means applied to said springs, for the purpose set forth.

16. In an aeroplane flying machine, a frame, oppositely extending planes hinged to said frame to swing vertically, hollow posts constituting parts of said frame and inclined rearwardly at their upper ends, guide rods in said hollow posts, sleeves fixed to said posts between which and collars at the lower ends of the rods compression springs, surrounding the rods, are interposed and two pairs of brace elements at each side of the machine, the brace elements of each pair being attached at their upper ends to one of the guide rods and attached at their lower ends at laterally separated points to the planes.

17. In an aeroplane flying machine, a frame, oppositely extending planes hinged to said frame, inclined posts carried by said frame, spring controlled guides carried by said posts, two pairs of connected elements one at each side of the machine, the connected elements of each pair being attached at one end to one of the guides and attached at their outer ends to the adjacent plane at laterally separated points of the plane.

18. In an aeroplane flying machine, a frame, oppositely extending planes hinged to said frame to swing vertically, hollow posts constituting parts of said frame and inclined rearwardly at their upper ends, guide rods in said hollow posts, sleeves fixed to said posts between which and collars at the lower ends of the rods compression springs, surrounding the rods, are interposed and two pairs of brace elements at each side of the machine, the brace elements of each pair being attached to their upper ends to one of the guide rods and attached at their lower ends at laterally separated points to the planes, one brace element of each pair being attached to its plane nearer to the hinges of the plane than the associated brace element of said pair.

19. In an aeroplane flying machine, a frame, oppositely extending planes or wings hinged to said frame to swing vertically, posts constituting parts of said frame, guides carried by said posts, brace rods connected to said guides and to the planes between the ends of the latter and spring elements associated with said posts and acting on said guides to yieldingly hold said planes in operative position for flight, said guides being inclined upwardly and rearwardly, and said brace rods being arranged in pairs at each side of the machine, with the rods of each pair connected one near the front edge and the other near the rear edge of the associated plane.

20. In an aeroplane flying machine, a frame, oppositely extending planes or wings hinged to said frame to swing vertically, posts constituting parts of said frame, guides carried by said posts, brace rods connected to said guides and to the planes between the ends of the latter, spring elements associated with said posts and acting on said guides to yieldingly hold said planes in operative position for flight, said guides being inclined upwardly and rearwardly, cables attached to said guides, pulleys about which the cables are trained, and means at the pilot's seat for actuating said cables.

21. In an aeroplane flying machine, a frame, oppositely extending planes or wings hinged to said frame, to swing vertically, posts constituting parts of said frame guides carried by said posts, brace rods connected to said guides and to the planes between the ends of the latter, spring elements associated with said posts and acting on said guides to yieldingly hold said planes in operative position for flight, said guides being inclined upwardly and rearwardly, cables attached to said guides, pulleys about which said cables are trained and a hand wheel adjacent to the pilot's seat about which said cables are trained and by which they are actuated.

22. In an aeroplane flying machine, a frame, oppositely extending planes or wings hinged to said frame to swing vertically, posts constituting parts of said frame, guides carried by said posts, brace rods connected to said guides and to the planes between the ends of the latter, spring elements associated with said posts and acting on said guides to yieldingly hold said planes in operative position for flight, said guides being inclined upwardly and rearwardly, cables attached to said guides, pulleys about which the cables are trained, a hand wheel adjacent to the pilot's seat about which said cables are trained and by which they are actuated, said hand wheel being rotative about its axis, and means whereby it may be bodily moved, for the purpose seat forth.

23. In an aeroplane flying machine, a frame, supporting and steering planes therefor, a horizontal following plane pivoted between its entering and following edges to the rear end of the frame, whereby air pressure beneath the same is unequal on opposite sides of its pivot when in flight, a rigid arm attached at its rear end to and extending forwardly from the following plane, a balancing spring carried by the frame and connections between the forward end of said arm and spring.

24. In an aeroplane flying machine, a frame, supporting and steering planes therefor, a horizontal following plane pivoted between its entering and following edges to the rear end of said frame, actuating bars extending forwardly therefrom to rock and warp said following plane, and a pivoted, vertically movable beam, to the opposite ends of which said actuating bars are attached.

25. In an aeroplane flying machine, a frame, oppositely extending planes or wings hinged to said frame to swing vertically, posts constituting parts of said frame, guides carried by said posts, brace rods connected to said guides and to the planes, between the ends of the latter, spring elements associated with said posts and acting on said guides to yieldingly hold the said planes in operative position for flight, cables attached to said guides, a controlling wheel to which said cables are attached, movable bearings for said hand wheel, and a foot lever to depress said bearings against the action of said spring elements.

26. In an aeroplane flying machine, a frame, oppositely extending planes or wings hinged to said frame to swing vertically, posts constituting parts of said frame, guides carried by said posts, brace rods connected to said guides and to the planes between the ends of the latter, spring elements associated with said posts and acting on said guides to yieldingly hold said planes in operative position for flight, said guides being inclined rearwardly and upwardly, and means whereby the angle of said posts may be varied.

27. In an aeroplane flying machine, a frame, oppositely extending planes or wings hinged to said frame to swing vertically, posts constituting parts of said frame, guides carried by said posts, brace rods connected to said guides and to the planes between the ends of the latter, spring elements associated with said posts and acting on said guides to yieldingly hold said planes in operative position for flight, said guides being inclined rearwardly and upwardly, said posts being hinged at their lower ends to the frame to swing forwardly and rearwardly and means to maintain the posts at a predetermined angle.

28. In an aeroplane flying machine, a frame, oppositely extending planes hinged thereto to swing vertically and presenting an angle of incidence to the air, means to vary the dihedral angle of said wings relatively to each other, combined with means to simultaneously vary the angle of incidence thereof, and means to adjustably limit the angle of incidence.

In testimony, that I claim the foregoing as my invention I affix my signature in the presence of two witnesses, this 21st day of May, A. D. 1913.

DE BERT HARTLEY.

Witnesses:
W. L. HALL,
G. E. DOWLE.

Copies of this patent may be obtained for five cents each, by addressing the "Commissioner of Patents, Washington, D. C."